Patented Jan. 1, 1929.

1,697,245

UNITED STATES PATENT OFFICE.

CHARLES A. KRAUS AND CONRAL C. CALLIS, OF WORCESTER, MASSACHUSETTS, ASSIGNORS TO STANDARD OIL DEVELOPMENT COMPANY, A CORPORATION OF DELAWARE.

ART OF PREPARING METALLO-ORGANIC COMPOUNDS.

No Drawing.   Application filed April 5, 1923.   Serial No. 630,089.

The present invention relates to the art of preparing organic compounds containing lead, and will be fully understood from the following description.

In proceeding in accordance with this invention, lead is prelminarily put in favorable condition for reaction. as for example, by being alloyed with a highly electropositive metal, as an alkali metal or alkaline earth metal. Using sodium for instance, an alloy is made up in the proportions desired. These may vary; for example the sodium may run up to around 20%; but an advantageous formula is lead 90% and sodium 10%.

The alloy is suitably subdivided to go through, say for example a 10-mesh screen, and it is advisable that care be taken to avoid exposure to air or moisture. The subdividing may be done in an atmosphere of inert or non-oxidizing character, as nitrogen for instance. If desired, instead of using a separate mill, the alloy may be disintegrated in the final reaction vessel itself, in which case the vessel may also contain a suitable milling or crushing means, or the vessel may be mounted to rotate and be equipped with balls or the like in the manner of a ball-mill, this being particularly advantageous, as subsequently in the reaction the balls can also serve as agitating and heat transfer means. Ethyl chlorid is introduced in molecular proportion to the lead, or in excess, and if desired the sub-dividing step may be carried out in an atmosphere of ethyl chlorid as the oxygen-excluder. With the alloy subdivided and the proper amount of ethyl chlorid provided, the reaction is ready to proceed. It is desirable that the ethyl chlorid, or the like, be free from traces of water, having preliminarily been dried for instance by calcium chlorid or other suitable means. The reaction vessel should be pressure resistant and equipped with heating and cooling jackets or coils and suitable agitating or stirring means, so that adequate temperature control can be maintained.

Although reaction will occur slowly at ordinary temperatures, practically the reaction is started by warming up to about 35° C.; and cooling is subsequently used as may be necessary, the temperature, for good results being maintained at about 40–70° C., for example. Toward the end the temperature may be allowed to go higher, e. g. 100° C. Although this is above the boiling point of the ethyl chlorid, the reaction proceeds favorably in the closed vessel under pressure and is ordinarily complete in 2–6 hours. On completion, any excess ethyl chlorid may be distilled off and condensed, or the reaction vessel may be cooled down and the excess ethyl chlorid be pumped off and compressed so as to be saved for subsequent reactions.

Water may then be introduced, and steam may be bubbled in through suitable pipes. The lead tetraethyl, Pb $(C_2H_5)_4$, produced by the reaction is distilled off with the steam and is condensed and collected in a suitable receiver, and being heavier, it may be drawn off separately from the water of condensation. Generally this manner of removing the lead tetraethyl from the reaction vessel is preferable, but if desired it may instead be extracted by suitable solvents, as ether or acetone, and then separated from the solvent by distillation.

While the use of a catalyst is not essential, where desired such may be employed. In such case there may be added to the reaction mass, for example a metallic chlorid, as ferric chlorid, anhydrous aluminum chlorid or zinc chlorid in amount of 0.25 to 3%; or a metallic catalyst, for instance zinc may be initially added in the alloy, in amount of 0.5 to 3%.

A catalyst is more particularly of value where the alloy departs from the 90:10 proportion, and with a catalyst the alloy may vary in composition from about 81% to 94% for the lead and from about 6% to 19% for the sodium.

In place of ethyl chlorid, ethyl bromid may be used if desired. In this event it will generally be desirable to maintain the temperature 10–15° C. higher. Instead of the ethyl halids also methyl or other hydrocarbon halids may be employed to obtain correspondingly lead tetramethyl or other hydrocarbon compounds.

We claim:

1. The improvement in the art of preparing lead tetraethyl, which comprises alloying lead with about 10% of sodium, subdividing the alloy while substantially avoiding oxidation, and reacting upon the alloy with ethyl chlorid at a temperature of 35–70° C.

2. The improvement in the art of preparing lead tetraethyl, which comprises alloying lead with sodium, subdividing the alloy while substantially avoiding oxidation, and reacting upon the alloy with ethyl chlorid at a temperature above the normal boiling point of the ethyl chlorid.

3. The improvement in the art of preparing hydrocarbon compounds of lead, which comprises alloying lead with a highly electropositive metal, subdividing the alloy while substantially avoiding oxidation, and reacting upon the alloy with an alkyl chlorid at a temperature above the normal boiling point of the chlorid.

4. The improvement in the art of preparing hydrocarbon compounds of lead, which comprises alloying lead with a highly electropositive metal, and reacting upon the alloy with an alkyl chlorid at a temperature between about 70° C. and atmospheric temperature.

5. The improvement in the art of preparing lead tetraethyl, which comprises alloying lead with sodium, and reacting upon the alloy with ethyl chlorid at a temperature between about 70° C. and atmospheric temperature.

6. The improvement in the art of preparing lead tetraethyl, which includes subdividing an alloy of lead and a highly electropositive metal while substantially avoiding oxidation, and reacting upon the alloy with ethyl chlorid at a temperature above the normal boiling point of the ethyl chlorid.

7. The improvement in the art of preparing organic compounds containing lead, which includes subdividing an alloy of lead and a highly electropositive metal while substantially avoiding oxidation, and reacting upon the alloy with an alkyl chlorid at a temperature above the normal boiling point of the chlorid.

8. The improvement in the art of preparing lead tetraethyl, which includes reacting upon an alloy of lead and a highly electropositive metal with ethyl chlorid in the presence of ferric chlorid as a catalyst.

9. The improvement in the art of preparing organic compounds containing lead, which includes reacting upon an alloy of lead and a highly electropositive metal with an alkyl chlorid substantially freed from traces of water.

10. The improvement in the art of preparing organic compounds containing lead, which includes reacting upon an alloy of lead and a highly electropositive metal with ethyl chlorid at a temperature above the normal boiling point of the ethyl chlorid.

11. The improvement in the art of preparing organic compounds containing lead, which includes reacting upon an alloy of lead and a highly electropositive metal with ethyl chlorid.

12. The improvement in the art of preparing organic compounds containing lead, which includes reacting upon an alloy of lead and a highly electropositive metal with an alkyl chlorid while agitating the mass.

13. The improvement in the art of preparing organic compounds containing lead, which includes reacting upon an alloy of lead and a highly electropositive metal with an alkyl chlorid.

14. The improvement in the art of preparing organic compounds containing lead, which includes reacting upon lead with an ethyl halid at a temperature above the normal boiling point of the ethyl halid.

15. The improvement in the art of preparing organic compounds of lead, which comprises reacting upon an alloy of lead and a highly electropositive metal with an alkyl chlorid in the presence of a metallic chlorid selected from the group consisting of ferric chlorid, anhydrous aluminum chlorid or zinc chlorid.

16. The improvement in the art of preparing organic compounds containing lead, which includes reacting upon an alloy of lead and a highly electropositive metal with an ethyl halid at a temperature above the normal boiling point of the ethyl halid.

CHARLES A. KRAUS.
CONRAL C. CALLIS.